United States Patent [19]

Akai

[11] Patent Number: 4,734,588

[45] Date of Patent: Mar. 29, 1988

[54] X-RAY COMPUTED TOMOGRAPH DETECTOR

[75] Inventor: Yoshimi Akai, Yaita, Japan

[73] Assignee: Kabushiki Kaisha Toshiba, Kawasaki, Japan

[21] Appl. No.: 898,393

[22] Filed: Aug. 20, 1986

[30] Foreign Application Priority Data

Aug. 21, 1985 [JP] Japan ................................. 60-181854

[51] Int. Cl.⁴ ................................................ G01T 1/22
[52] U.S. Cl. ..................................... 250/370; 250/366
[58] Field of Search ...................... 250/361, 366, 370 I, 250/370 R, 484.1, 363 S

[56] References Cited

U.S. PATENT DOCUMENTS

| | | | |
|---|---|---|---|
| 3,415,989 | 12/1968 | Leventhal et al. | 250/361 |
| 4,234,792 | 11/1980 | DeCou et al. | 250/370 I |
| 4,317,037 | 2/1982 | Suzuki et al. | 250/370 I |
| 4,607,164 | 8/1986 | Kubota et al. | 250/370 I |

FOREIGN PATENT DOCUMENTS 172273 10/1982 Japan ................................. 250/370 I

*Primary Examiner*—Janice A. Howell
*Attorney, Agent, or Firm*—Finnegan, Henderson, Farabow, Garrett & Dunner

[57] ABSTRACT

An X-ray CT detector is disclosed which detects the intensity of X-rays emitted from an X-ray source and transmitted through a subject. The detector comprises a multi-channel scintillator element array and a multi-channel photo-semiconductor element array. The scintillator element array and photo-semiconductor element array are bonded together in an arcular form. The scintillator element array consists of a plurality of polycrystalline pieces each constituting a scintillator element which emits light according to X-ray incidence. The photo-semiconductor element array is provided on the outer side of the scintillator element array and consists of an amorphous silicon film. The photo-semiconductor element array has a plurality of photo-semiconductor element sections each corresponding to each scintillator element and detecting the intensity of light emitted from each scintillator element.

7 Claims, 10 Drawing Figures

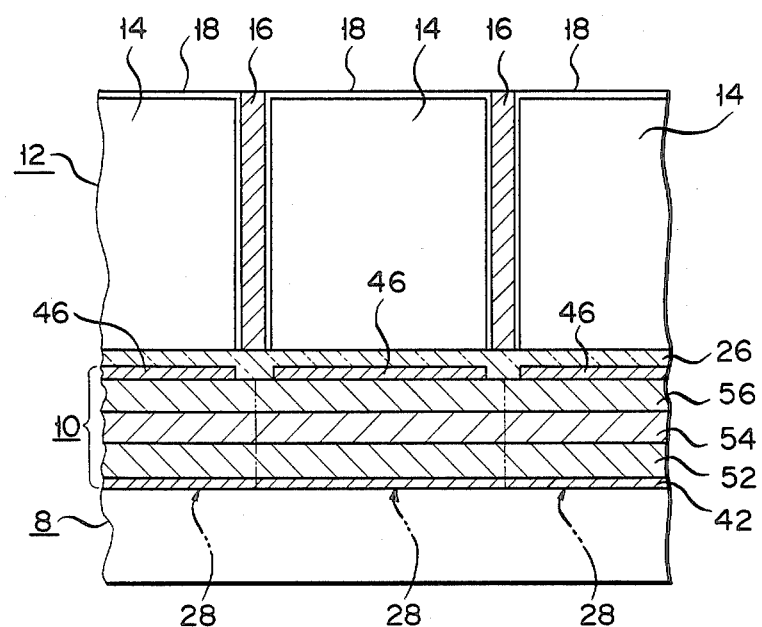
F I G. 10

X-RAY COMPUTED TOMOGRAPH DETECTOR

BACKGROUND OF THE INVENTION

This invention relates to an X-ray CT (computed tomogram) of a subject with X-rays.

Recently, various kinds of apparatuses for observing the tomogrammic structure of various parts of a patient using X-rays have been developed. For example, an X-ray CT apparatus of the third generation is provided with an X-ray source and an X-ray detector. The X-ray source is to irradiate the subject with a flat X-ray fan-shaped beam having a predetermined fan angle. The X-ray detector consists of a plurality of X-ray detection elements which detect the intensity of X-rays generated at the X-ray source and transmitted through the subject. The X-ray source and detector can be rotated in the same direction and at the same time about the subject in a state such that they always face each other on the direct opposite sides of the subject. In this way, X-ray projection data from various directions of an examined section of the subject is collected. After sufficient data has been collected, this data is analyzed by a computer to calculate X-ray absorption factors corresponding to various positions on an examined section of the subject. A graduation corresponding to the X-ray absorption factor is given to a corresponding position of the subject, whereby image data of the subject's examined section can be obtained.

With such a third generation X-ray CT apparatus, a given X-ray detection element of the detector collects X-ray projection data of the subject on a fixed circle at all times. Therefore, the detector of the apparatus has to meet the following requirements.

(1) There should be no sensitivity difference among the detection elements.

(2) The detection elements should be arranged at a constant pitch, and also a plurality of detection elements should be integrated such that there is no seam or gap between adjacent detection elements.

(3) The sensitivity should not vary according to temperature changes.

A detector of ion-chamber type has been used in which xenon (Xe) is sealed under a high pressure and a plurality of metal plates of tungsten, molybdenum, etc. having a high X-ray absorption factor are assembled at a uniform pitch to serve as both collimators and electrodes. However, such a detector of an ion-chamber type has the following drawbacks.

(1) Since a gas is used, the X-ray absorption factor is inferior.

(2) Since the gas is sealed under a high pressure, a pressure vessel is necessary, so that the detector is inevitably large in size, heavy in weight, and high in cost.

(3) During long use, gas leakage occurs resulting in variations in the characteristics.

(4) Microphonic noises are produced because of vibration.

Accordingly, a detector has recently been developed, in which solid-state scintillator elements and photo-semiconductor elements are bonded together. This detector can overcome the above drawbacks in the ion chamber type detector. However, it has the following drawbacks.

(1) Single crystal scintillators are used as the scintillator elements. Therefore, the optical outputs of the elements can not be made uniform, resulting in a sensitivity difference among the elements. In addition, the optical output is reduced with temperature rise, resulting in sensitivity variations. Further, the scintillators are expensive. Furthermore, it is impossible to provide a constant pitch of channels (i.e., elements).

(2) The photo-semiconductor elements are mainly made from a single crystal of silicon. Therefore, it is impossible to provide one having a large enough area to integrate a plurality of channels (e.g., 512 channels).

(3) The photo-semiconductor elements are flat plates. Therefore, if a plurality of photo-semiconductor elements are to be arranged as an arcular row so that they are directed toward a focal point of the X-ray source, a seam or gap is produced between adjacent elements.

SUMMARY OF THE INVENTION

An object of the invention is to provide an X-ray CT detector which is free from sensitivity differences among channels, has a constant pitch of channels, is free from sensitivity variations with temperature, is inexpensive, is free of seams, and is capable of having a large area.

According to one aspect of the present invention, there is provided an X-ray CT detector, which comprises an arcular multi-channel scintillator element array made of a plurality of polycrystal line pieces, each of the polycrystal line pieces constituting a scintillator element which emits light in accordance with X-ray incidence, and a multi-channel photo-semiconductor element array provided on the outer side of the multi-channel scintillator element array made of an amorphous silicon film, the photo-semiconductor element array having a plurality of photo-semiconductor element sections corresponding to the respective scintillator elements, each photo-semiconductor element section functioning to detect the intensity of light emitted from a corresponding scintillator element.

According to the invention, the multi-channel scintillator element array consists of a plurality of polycrystal line pieces. Thus, a uniform optical output can be obtained from the individual channels, and a difference in sensitivity among the channels can be eliminated. Also, the optical output will not be reduced with temperature increase, so that the sensitivity is stable. Further, it is possible to provide a constant pitch of channels, and the price is low. Further, since the multi-channel photo-semiconductor element consists of an amorphous silicon film, it is possible to provide one having a large area enough to integrate a plurality of channels, and no seam is produced.

BRIEF DESCRIPTION OF THE DRAWINGS

FIGS. 1 to 4 illustrate an embodiment of the invention, in which:

FIG. 1 is a schematic elevational view showing an X-ray CT apparatus;

FIG. 2 is a side view showing the same apparatus;

FIG. 3 is a fragmentary enlarged-scale view showing an X-ray CT detector; and

FIG. 4 is an enlarged-scale sectional view showing the X-ray CT detector;

FIGS. 5 and 6 show a first modification of a multi-channel photo-semiconductor element array in an X-ray CT detector, in which:

FIG. 5 is a side view showing the same;

FIG. 6 is a plan view showing the same;

FIGS. 8 and 9 show a third modification of the multi-channel photo-semiconductor element in an X-ray CT apparatus, in which:

FIG. 8 is a side view of the same;

FIG. 9 is a plan view of the same; and

FIG. 10 is a view showing a fourth modification of the multi-channel photo-semiconductor element array in an X-ray CT detector.

DETAILED DESCRIPTION OF THE PREFERRED EMBODIMENT

Now, a first embodiment of the invention will be described with reference to FIGS. 1 to 4.

Figure 1:
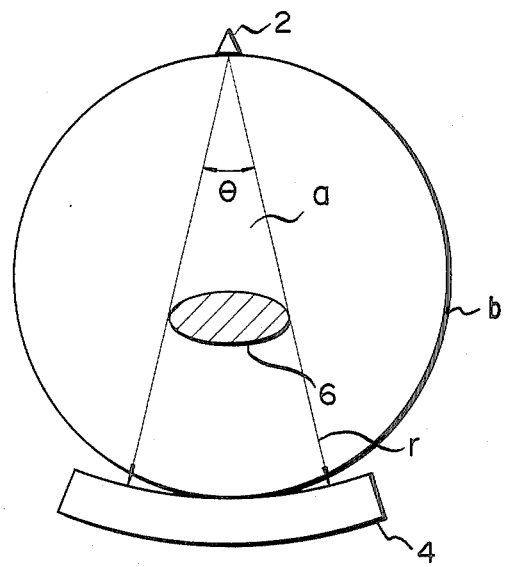
Figure 2:
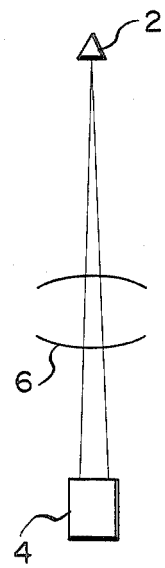

FIGS. 1 and 2 show an X-ray CT apparatus of the third generation using an X-ray CT detector according to the invention. Reference numeral 2 designates an X-ray tube, and 4 a detector. X-ray tube 2 serves to irradiate the subject 6 with a flat X-ray fan beam with fan angle $\theta$. Detector 4 serves to detect the intensity of X-rays generated from X-ray tube 2 and transmitted through subject 6. X-ray tube 2 and detector 4 are disposed such that they can be rotated in the same direction and at the same speed about the subject 6 in a state such that they face each other on the opposite sides of object 6. More specifically, they are rotated in the same direction and at the same speed along circle b.

Figure 3:
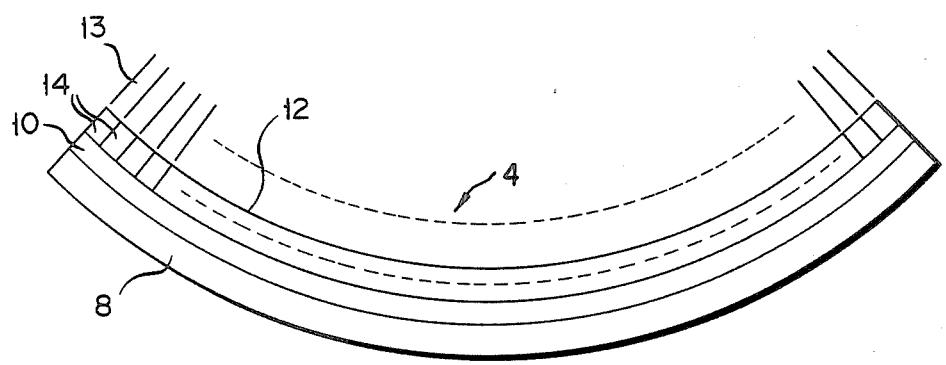

Detector 4, as shown in FIG. 3, has arcular insulating base 8. Multi-channel photo-semiconductor element array 10 is arcularly bonded to the inner surface of base 8. Multi-channel scintillator element array 12 is arcularly bonded to the inner surface of photo-semiconductor element array 10. A large number of collimators 13 are arcularly arranged on the inner surface of scintillator element array 12 to eliminate the rays scattered by subject 6. Collimators 13 are arranged such that they correspond in position to respective scintillator elements 14 (which will be mentioned later).

Figure 4:
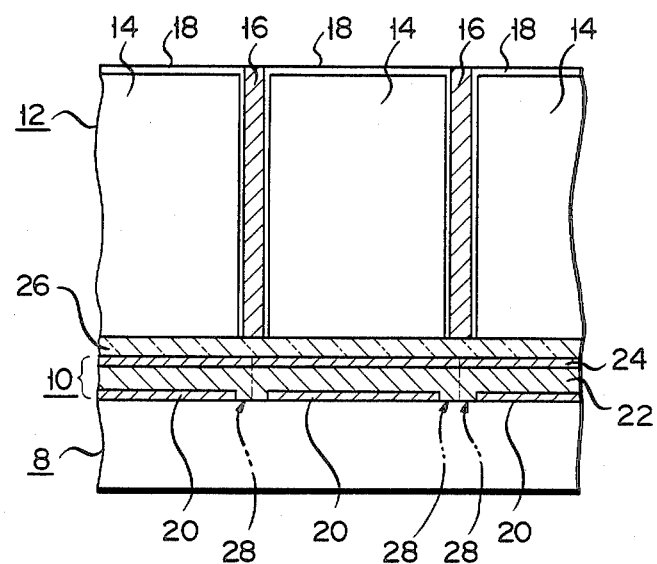

Multi-channel scintillator element array 12, as shown in FIG. 4, consists of a plurality of polycrystal line pieces of praseodymium-activated gadolinium sulfiate ($Gd_2O_2S:Pr$) formed by a hot, static water pressure press process. Each crystal piece constitutes scintillator element 14. Each scintillator element 14 emits light according to X-ray incidence. Separator 16 is disposed between adjacent scintillator elements 14 so as to prevent characteristic X-rays, which are generated in scintillator elements 14, from entering the adjacent channels. Separator 16 consists of a thin plate of lead, tungsten, or molybdenum as an X-ray absorptive material. Light-reflecting layer 18 is formed on each scintillator element 14 except for its surface on the side of multi-channel photoconductive element array 10. The inner surface of multi-channel scintillator element array 12 having the above construction is disposed along an arc with the center at the focal point of X-ray tube 2 and radius of curvature equal to distance r from focal point of X-ray tube 2 to inner surface of multi-channel scintillator element array 12.

Multi-channel photo-semiconductor element array 10 has a plurality of signal take-out electrodes 20, non-crystalline silicon film 22 and transparent electrode 24 for grounding. Signal take-out electrodes 20 consist of a chromium film, for instance, and are formed on the inner surface of base 8 in correspondence to scintillator elements 14. Amorphous silicon film 22 is formed by a plasma CVD process on the inner surface of base 8 from above signal take-out electrodes 20. Transparent electrode 24 for grounding is formed, for instance, as an indium tin oxide film on the inner surface of amorphous silicon film 22. Multi-channel scintillator element array 12 is bonded by transparent adhesive 26 to the inner surface of multi-channel photo-semiconductor element array 10 formed in this way. Multi-channel photo-semiconductor element array 10 has photo-semiconductor element sections 28 each for each of signal take-out electrodes 20, i.e., scintillator elements 14. Photo-semiconductor element sections 28 detect the intensity of light emitted from corresponding scintillator elements 14.

With the X-ray CT apparatus having the above construction, multi-channel scintillator element array 21 is irradiated with an X-ray fan beam with fan angle emitted from X-ray tube 2, each scintillator element 14 emits light having an intensity corresponding to the intensity of the incident X-rays. The light intensity is detected by photo-semiconductor element sections 28 corresponding to scintillator elements 14 of multi-channel photo-semiconductor element array 10. The detection signal is provided from signal take-out electrodes 20. The detection signal is processed in a processor (not shown) to obtain a tomogram.

With the above construction, in which multi-channel scintillator element array 12 consists of a plurality of fluorescent polycrystals formed from praseodymium activated gadolinium sulfide ($Gd_2O_2S:Pr$) by the hot static water pressure press process, uniform optical output can be obtained, and sensitivity differences among the channels can be eliminated. Further, the optical output is not reduced with temperature rise, and the sensitivity can be stabilized. Further, it is possible to provide a constant pitch of channels and to reduce cost. Further, since the multi-channel photosemiconductor element array 10 consists of amorphous silicon film 22 formed by the plasma CVD process, it may be of a large area to permit integration of a plurality of channels, and no seam is produced.

Figure 5:
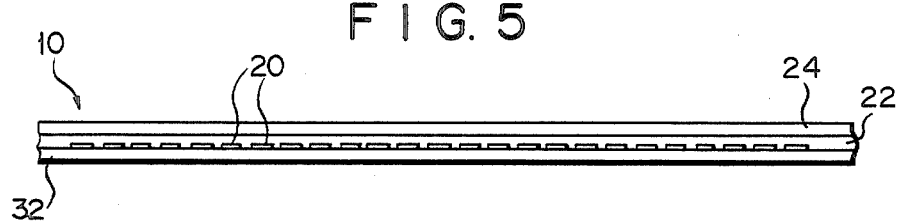
Figure 6:
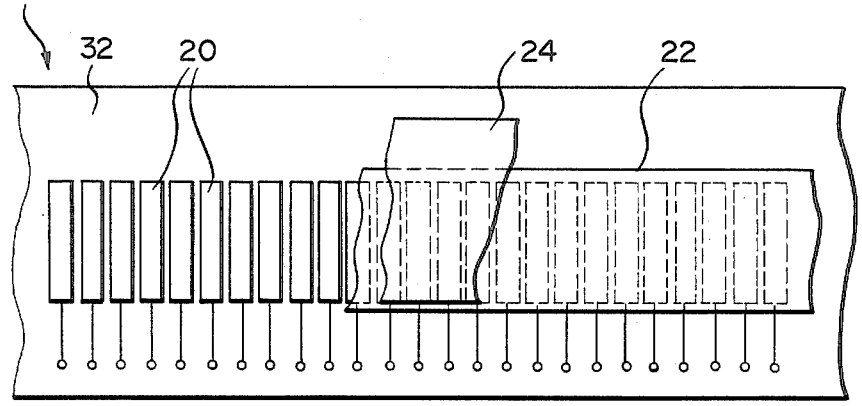

FIGS. 5 and 6 show a first modification of multichannel photo-semiconductor element array 10. In this modification of multi-channel photo-semiconductor element array 10, signal take-out electrodes 20, amorphous silicon film 22 and transparent electrode 24 for grounding are formed in the mentioned order on an insulating film 32 with a thickness of 50 to 500 $\mu$m, which is a flexible film such as a polyimide resin film, a polyester resin film, a teflon resin film, etc. Insulating film 32 of multi-channel photo-semiconductor element array 10 is bonded to the inner surface of circular base 8, and multi-channel scintillator element array 12 is bonded to grounding electrode 24 of multi-channel photo-semiconductor element array 10. With this construction, it is possible to obtain the same functions and effects as in the above embodiment. In addition, the step of forming amorphous silicon film 22 and electrodes 20 and 24 and a step of bonding multi-channel photo-semiconductor element array 10 and multi-channel scintillator element array 12 in the manufacturing process can be facilitated. Base 8 need not be insulating.

Figure 7:
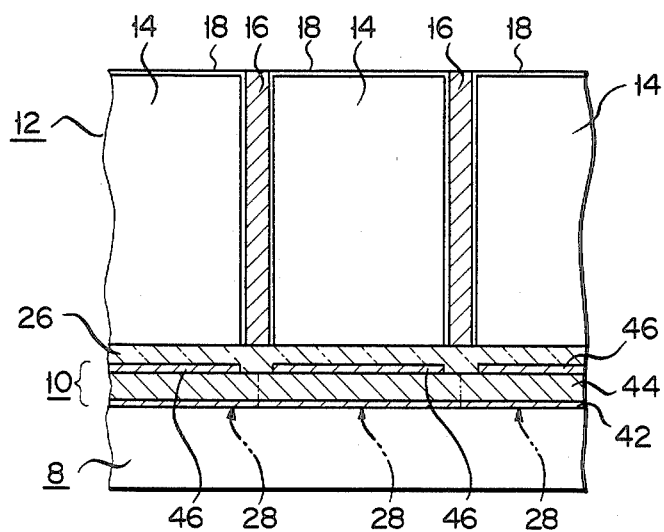
FIG. 7 is a view showing a second modification of the multi-channel photo-semiconductor element array in an X-ray CT dector.

FIG. 7 shows a second modification of multi-channel photo-semiconductor element array 10. In FIG. 7, parts like those in FIG. 4 are designated by like reference numerals, with omission of their detailed description.

In this case modification of multi-channel photo-semiconductor element array 10, grounding electrode 42 consisting of a chromium film, for instance, and amorphous silicon film 44 based on plasma CVD process, are formed in the mentioned order on insulating base 8. On amorphous silicon film 44 are formed signal take-out electrodes 46 consisting of an indium oxide-tin film, for instance, in correspondence to scintillator elements 14 of multi-channel scintillator element array 12. Again with this construction, the same functions and effects as in the previous embodiment can be obtained.

Figure 8:
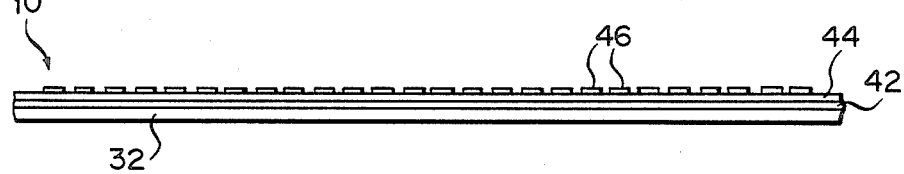
Figure 9:
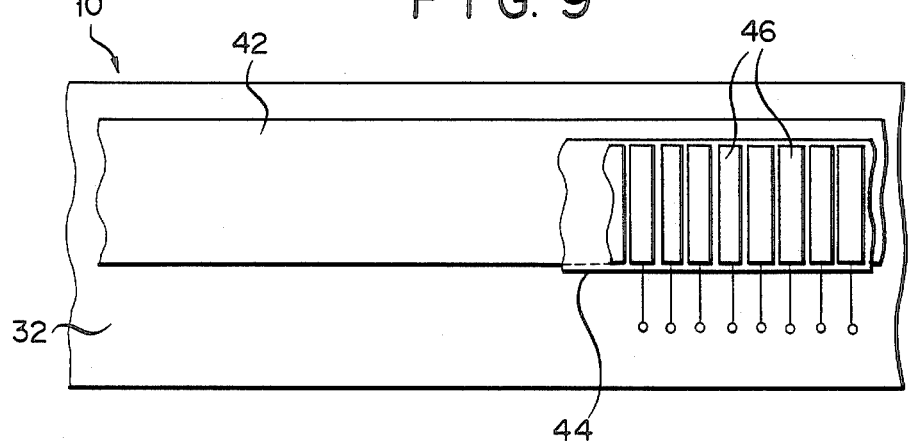

FIGS. 8 and 9 show a third embodiment of multi-channel photo-semiconductor element array 10. In this modification of multi-channel photo-semiconductor element array 10, grounding electrode 42, amorphous silicon film 44 and signal take-out electrodes 46 are formed in the mentioned order on insulating film 32 with a thickness of 50 to 500 μm, which is a flexible film, e.g., a polyimide resin film, a polyester resin film, a teflon resin film, etc. Insulating film 42 of multi-channel photo-semiconductor element array 10 is bonded to the inner surface of azrcular base 8, and multi-channel scintillator element array 12 is bonded to signal takeout electrode 46 of multi-channel photo-semiconductor element array 10. Again with this construction, the same functions and effects as in the first modification can be obtained.

FIG. 10 shows a fourth modification of multi-channel photo-semiconductor element array 10. In FIG. 10, parts like those in FIG. 7 are designated by like reference numerals, with omission of their detailed description.

In this modification, grounding electrode 42 consisting of a chromium film, for instance, n-type amorphous silicon film 52 based on plasma CVD process, i-type amorphous silicon film 54 also based on plasma CVD process, and p-type amorphous silicon film 56 are formed in the mentioned order on insulating base 8. On p-type amorphous silicon film 56 are formed signal takeout electrodes 46 consisting of, for example, an indium oxide-tin film corresponding to respective scintillator elements 14 of multi-channel scintillator element array 12. With this construction, it is possible to obtain the same functions and effects as in the above embodiment. In addition, it is possible to obtain high optical sensitivity and high response speed.

The above embodiment of the X-ray CT apparatus according to the invention has been applied to an X-ray CT apparatus of the third generation, but it is by no means limitation. For example, the invention may also be applied to an X-ray CT apparatus of the fourth generation, in which a plurality of detectors are provided in parallel and in close contact with one another on a circle with the center disposed on a subject to be examined. Further, the invention may also be applied to an X-ray CT apparatus such as that disclosed in Japanese patent Publication No. 55-3940, in which a ring-like target is provided to surround a subject, X-rays obtained by projecting an electron beam on the target are taken out in a direction toward the center of the target to irradiate the subject, and the electron beam is moved along the target to vary the direction of the X-ray irradiation of the subject at a high speed.

Additional advantages and modifications will readily occur to those skilled in the art. Therefore, the invention in its broader aspects is not limited to the specific details, representative devices, illustrative examples shown and described. Accordingly, departures may be made from such details without departing from the spirit or scope of the general inventive concept as defined by the appended claims and their equivalents.

What is claimed is:

1. A detector for detecting the intensity of X-rays emitted from an X-ray source and transmitted through a subject to said detector, said detector comprising:
   an arcular multi-channel scintillator element array having a plurality of polycrystalline pieces, each of said polycrystalline pieces constituting a scintillator element which emits light in accordance with X-ray incidence, said polycrystalline pieces being positioned adjacent to one another to form a receiving surface for receiving the X-rays and to form an outer surface opposite said receiving surface; and
   a multi-channel photo-semiconductor element array provided on said outer surface of said multi-channel scintillator element array, said photo-semiconductor element array including a plurality of photo-semiconductor element sections having an amorphous silicon film formed on a flexible insulating film, each of said photo-semiconductor element sections detecting the intensity of light emitted from a corresponding one of said scintillator elements.

2. The detector according to claim 1, wherein said multi-chanel scintillator element array is shaped to conform to a circle, said detector having an X-ray source with a focal point located at the center of said circle, the radius of said circle corresponding to the distance from said focal point of said X-ray source to said multi-channel scintillator element array.

3. The detector according to claim 1, wherein each of said polycrystalline pieces includes praseodymium-activated gadolinium sulfate.

4. The detector according to claim 1, wherein said amorphous silicon film of said multi-channel photo-semiconductor element array is formed by a plasma CVD process.

5. The detector according to claim 4, wherein each of said semiconductor element sections of said multi-channel photo-semiconductor element array has a grounding electrode provided on one surface of said amorphous silicon film and a signal take-out electrode provided on the other surface of said amorphous silicon film.

6. The detector according to claim 5, wherein said grounding electrode is provided on the surface of said amorphous silicon film adjacent to said outer surface of said multi-channel scintillator element array.

7. The detector according to claim 5, wherein said signal take-out electrode is provided on the surface of said amorphous silicon film adjacent to said outer surface of said multi-channel scintillator element array.

* * * * *